(12) United States Patent
Richter et al.

(10) Patent No.: US 8,280,732 B2
(45) Date of Patent: Oct. 2, 2012

(54) SYSTEM AND METHOD FOR MULTIDIMENSIONAL GESTURE ANALYSIS

(76) Inventors: Wolfgang Richter, Starnberg (DE); Roland Aubauer, Wessling (DE)

( * ) Notice: Subject to any disclaimer, the term of this patent is extended or adjusted under 35 U.S.C. 154(b) by 596 days.

(21) Appl. No.: 12/411,514

(22) Filed: Mar. 26, 2009

(65) Prior Publication Data

US 2010/0063813 A1 Mar. 11, 2010

Related U.S. Application Data

(60) Provisional application No. 61/039,828, filed on Mar. 27, 2008.

(51) Int. Cl.
*G10L 15/00* (2006.01)
(52) U.S. Cl. ........ 704/231; 715/863; 715/246; 715/204; 709/204; 706/11; 704/275; 704/271; 704/260; 704/209; 704/208; 704/200; 455/456.1; 381/380; 340/541
(58) Field of Classification Search .................. 715/204, 715/863, 246; 704/260, 208, 275, 271, 209, 704/200; 340/541; 455/456.1; 381/380; 709/204; 706/11
See application file for complete search history.

(56) References Cited

U.S. PATENT DOCUMENTS

| | | | | |
|---|---|---|---|---|
| 5,544,050 A | * | 8/1996 | Abe et al. | 715/246 |
| 5,734,923 A | * | 3/1998 | Sagawa et al. | 715/204 |
| 6,006,175 A | * | 12/1999 | Holzrichter | 704/208 |
| 6,081,193 A | * | 6/2000 | Trucchi et al. | 340/541 |
| 7,676,372 B1 | * | 3/2010 | Oba | 704/271 |
| 2002/0111794 A1 | * | 8/2002 | Yamamoto et al. | 704/200 |
| 2003/0046087 A1 | * | 3/2003 | Johnston et al. | 704/275 |
| 2005/0185813 A1 | * | 8/2005 | Sinclair et al. | 381/380 |
| 2006/0235692 A1 | * | 10/2006 | Mukhtar et al. | 704/260 |
| 2007/0168187 A1 | * | 7/2007 | Fletcher et al. | 704/209 |
| 2008/0059578 A1 | * | 3/2008 | Albertson et al. | 709/204 |
| 2009/0054077 A1 | * | 2/2009 | Gauthier et al. | 455/456.1 |
| 2010/0100509 A1 | * | 4/2010 | Johnston et al. | 706/11 |
| 2010/0281435 A1 | * | 11/2010 | Bangalore et al. | 715/863 |

FOREIGN PATENT DOCUMENTS

| | | |
|---|---|---|
| DE | 102007016408 | 10/2008 |
| DE | 102007036636 | 2/2009 |
| WO | WO-2007085367 | 8/2007 |

OTHER PUBLICATIONS

Wachsmuth, Communicative Rhythm in Gesture and Speech, 1999, University of Bielefeld, all pages.*

* cited by examiner

*Primary Examiner* — Michael Colucci
(74) *Attorney, Agent, or Firm* — King & Spalding L.L.P.

(57) ABSTRACT

Hand gestures are translated by first detecting the hand gestures with an electronic sensor and converting the detected gestures into respective electrical transfer signals in a frequency band corresponding to that of speech. These transfer signals are inputted in the audible-sound frequency band into a speech-recognition system where they are analyzed.

31 Claims, 11 Drawing Sheets

SYSTEM AND METHOD FOR MULTIDIMENSIONAL GESTURE ANALYSIS

CROSS REFERENCE TO RELATED APPLICATION

This application is related to provisional application 61/039,828 filed 27 Mar. 2008.

FIELD OF THE INVENTION

The invention relates to a system and method for generating control signals on the basis of gestures, in particular hand and/or finger gestures that are performed by a user face to face with a detection device.

BACKGROUND OF THE INVENTION

International Patent Application PCT/EP2007/00355 [WO/2007/085367] filed by the present applicant discloses a control system for a vehicle that includes an electrode arrangement by means of which the spatial movement of one of the driver's or passenger's hands may be detected and, based on the movement, switching and input operations may be initiated, for example, for operating a navigation device.

German patent application DE 10 2007 016 408, also filed by the present applicant, discloses a mobile telephone equipped with a sensor device by means of which input operations may be made in a contact-free fashion via the user's finger.

In addition, German patent application DE 10 2007 039 163 filed by the present applicant discloses a computer mouse that allows mouse and menu control functions to be performed by means of hand gestures relative to the computer mouse.

German patent application DE 10 2007 036 636 filed by the present applicant and German patent application DE 10 2008 009 956 disclose a doll provided with multiple electrodes by way of which the gestures of the child playing with the doll relative to the doll may be detected, thus operating language playback functions of the doll and, optionally, activating mechatronic components of the doll. This technology makes it possible to develop a particularly realistic dialog with the toy that is not monotonous.

In the systems mentioned above, the spatial movement of a hand is detected relative to the detection system on the basis of field-electrical interactive effects. For this purpose, the detection system is equipped with electrodes that are integrated into LC networks and that deliver signals that provide information on the spacing between the hand and the electrode. These signals may be used to calculate the path of a gesture. Gestures may in turn be determined from the calculated path.

The calculation of distance and path information may be done by an electronic circuit in which characteristic gesture paths are stored in an electronic memory.

OBJECT OF THE INVENTION

The object of the invention is to create solutions that allow reliable detection and interpretation of gestures to be managed with the lowest possible hardware cost and a broad spectrum of input gestures to be reliably processed.

SUMMARY OF THE INVENTION

This object is attained according to a first aspect of the present invention by a method of conducting signal processing of input signals generated as hand gestures that are performed by a user relative to a detection system and that correlate with the spatial movement of the hand or its fingers, with the input signals being generated or transformed in such a way that they constitute transfer signals whose frequency band includes the frequency band of sound signals accessible to a language-recognition system, with the interpretation of the hand gestures occurring via the language-recognition system on the basis of the transfer signals.

Thus, it becomes possible in an advantageous fashion to detect and analyze gestures using proven circuit and analysis systems developed for the field of speech recognition. Here, applications are possible in which concepts and chip sets developed for speech recognition are used exclusively for gesture recognition. It is also possible for speech-recognition systems to also be equipped with gesture-recognition functions; the microphone input may also function directly as an input for gesture signals. The concept according to the invention for the conversion of gesture paths into sound-like sequences may be implemented in common computer systems and other systems in which language recognition can be implemented, in particular microprocessors, with a relatively low expenditure for additional hardware. The sound-like sequences generated according to the invention may be generated in such a way that, in appropriate systems, they are coupled into the acoustic input of the system with an intermediate plug, and optionally overlain with microphone signals. This concept allows language recognition programs to be expanded in a particularly advantageous manner to include gesture interpretation functions. The detection electrodes provided for acquiring gestures and/or for detecting the spatial movement of the signing hand or, optionally, only fingers, may in particular be integrated into a headset, a keyboard, a mouse pad, a computer mouse, or even a monitor frame. The detection electrodes may also be integrated into other structures that are suitable as a typical reference point for gesture detection. In the automotive field, structures in the region of the control panel, the steering wheel, the center console, and the door linings are particularly suitable for this purpose.

The sensor device according to the invention may also be structured so that it is able to detect predominately static gestures, for example, static hand shapes, and is able to convert the gestures into sufficiently distinct sound sequences. Static gestures of this kind may be embodied, for example, as a "flat hand," "fist with extended thumb," or "victory sign." A certain sound sequence may be generated for these static gestures based on the sensor signals generated during the static phase. It is also possible for the movement sequence typical of the structure and breakdown of the static gestures to be reproduced as sound and be taken into account when recognizing the gestures.

By conversion of the path signals correlating with the gesture into sound-like signal sequences, the gesture information also becomes transmittable over telecommunications and VoIP systems within the frequency range of the sound data. The gesture information may thus also be made available by an operator, i.e. a signing user at a remote location, using voice transmission systems. The concept according to the invention also allows sign language to be converted into sound-based language.

Recognition patterns for the individual gestures may be calculated using teaching processes, or even calculated with respect to certain paths, and saved for analysis.

According to the invention, gestures made by living beings (preferably humans) are detected with the aid of a detector and converted into tone sequences (sound sequences). These tone sequences may then be analyzed and evaluated using current methods of speech or sound processing. Verbally spoken commands may optionally be included in this process in a parallel manner over the same channel and may be analyzed together with the gestures, individually, or subsequently to one another.

Preferably, the tone sequences generated by the gesture recognition circuit are produced in the same frequency band as the speech input, such that filtering methods used in speech processing may also be used. However, it is also possible for another frequency range, for example, displaced to the edge region of the processed frequency range, to be selected. In a manner similar or identical to spoken commands, gestures may then be trained into the system and, upon their return, may be expressed in functions saved, for example in a table. Thus, the same hardware and software may be used as in speech processing, up to the gesture/tone sequence converter, representing an advantage in terms of economics and circuitry as compared to separately operating systems. Here, the gestures in question may be performed in a spatial fashion in front of a detection device at a certain time interval and are user-independent to a large extent.

In principle, the concept according to the invention is suitable for the most varied techniques of gesture detection such as optical, capacitive, or image-processing techniques. It is advantageous for the detection of the gestures to occur in sequence and for a particular tone to be producible for each sequence. Thus, a simple or a complex gesture will produce a varied series of tones with a longer or shorter duration. Because no one is ever able to input the same gesture in precisely the same manner, the system preferably has a tolerant recognition, which is preferably program-based. According to the invention, appropriate software may be provided using the recognition and interpretation procedures provided in the software system, in particular if the series of tones correlating according to the invention with the gesture, in particular the gesture path, has a similar characteristic to a spoken word or sentence.

Acquiring the Gesture Signals

The gesture signals are preferably acquired with the aid of one or more capacitive (e-field) sensors. These sensors are preferably structured such that they detect changes in an artificially produced electric field and thus send signals accordingly that correlate sufficiently closely with the position or movement of the hand or fingers.

The gesture signals are preferably preprocessed. This preprocessing may advantageously be coordinated with a gesture that has already been recognized. Gesture detection may occur by splitting/demultiplexing of the signal or, in the case of the preferred use of multiple sensors, signals provided by the sensor(s).

The gestures are preferably interpreted in that sensor signals are generated for at least two, preferably three, spatial coordinates. These sensor signals are preferably obtained in a multi-channel measurement system; the sensor signals may be captured in a parallel, multi-channel fashion or in time multiplex. It is also possible to excite the system in a time multiplex or even frequency multiplex.

The conversion of the carrier-modulated (electrode receiving) signals from the various sensor channels may occur in particular by envelope curve detection and/or rectification and low-pass filtering (motion frequency<low-pass frequency<carrier frequency) in low-frequency receiving signals whose amplitude is proportional to the proximity to/distance from the receiving sensor.

It is possible to recognize a gesture beginning and gesture end with the aid of one or more combinations of the following methods:

a) Proximity detection: Signals from the e-field sensors are recognized as gestures when at least one sensor signal exceeds or falls below a certain level, which may be predetermined or self-setting in an adaptive fashion.

b) Movement detection: Signals from the e-field sensors with a minimum alteration speed are recognized as gestures. For this purpose, it is advantageous to create the mathematical derivative of these signals. As an alternative, it is also possible to perform a high-pass filtering operation corresponding to the derivative.

c) Measures a) and b) discussed above may also be performed in combination.

According to a particularly preferred embodiment of the invention, the gesture signals are normalized, for example, by the subtraction of the average time value and/or direct signal portion of all sensor signals from the respective individual sensor signals.

Moreover, it is possible to perform coordinate transformations of the detected sensor signals such that the corresponding gestures are mapped in a spatial reference plane. This gesture reference plane preferably lies essentially parallel to the electrode surfaces and transverse to the sensor axis, such that the corresponding gestures are always mapped at a certain distance to the sensor origin. The center of the surface spanned by the gesture is advantageously located on the sensor axis.

The conversion of multi-dimensional sensor signals thus transformed preferably occurs by a voltage-frequency transformation (e.g. VCO) into suitable tone series that lie in the typical spoken frequency range of 50 Hz-8000 Hz or 300-3400 Hz (telephone band range), such that the various (typically three) sensor signals are transferred into one single gesture signal (one channel) to be analyzed. In the next step, this gesture signal is provided for analysis.

The sensor signals may be generated as time multiplex signals. The conversion or transformation of the sensor signals by means of VCO conversion preferably results in signals that are each in different frequency bands within the speech frequency range.

Gesture Recognition

The recognition of the gestures preferably occurs using a DTW (dynamic time warping) pattern recognizer for recognizing whole gestures, analogous to word recognition in speech recognizers. These recognizer types are characterized by a selectivity among similarly performed gestures that is sufficient for numerous applications and thus by a rate of recognition sufficient for a smaller spectrum of gestures with relatively marked gestures.

As an alternative to the approach of DTW pattern recognition mentioned above, it is also possible to use a method of the Hidden Markov Model (HMM) recognizer, which is also known as a speech-recognition concept. In this type of speech recognition, words are divided into phonemes, atomic, quasi-static sounds of speech. Analogously, gestures are divided into gesture fragments that are represented by statuses in HMM. Any parts of a gesture may be used as gesture fragments, i.e. any given gestures of preferably the finger, hand, and/or arm, in particular straight-line or bent movements, changes in orientation (e.g. rotation of the hand), changes in shape (e.g. opening the hand), as well as any derived and integrated forms of these changes (movement lengths, speeds, etc.) These gesture fragments are individually recognized one after the other and assigned by the HMM recognizer back into the associated total gestures (for this example: L gesture) that have been defined (in a training or description process).

Furthermore, the signals generated according to the invention as sound-like signal sequences and correlated with the hand gestures may also be analyzed by a neural network recognizer and gesture fragment classifier, in a manner analogous to speech recognition (phoneme classifier).

The measures mentioned above, as well as other known speech-recognition methods, may also be conducted in combination for the purpose of analyzing and thus interpreting the signal sequences generated as sound-like signal sequences.

Differentiation Between the Training and Recognition Phase

The gestures to be recognized are preferably trained at least once, preferably multiple times, and stored in the gesture recognizer as reference patterns. Gestures with the same meaning that are recognized during training as being too different are preferably rejected. Gestures that are not rejected and are sufficiently similar and therefore distinct may be combined by averaging the corresponding reference signals.

As an alternative to the training process, a graphic input of reference gestures, for example, mouse/menu-based, may be made (arrow from right to left, from the bottom upward, circle, etc.). The expected sensor signals corresponding to these input gestures may be calculated and stored in the gesture recognizer as a reference pattern.

Recognition Phase

During the recognition phase, the gesture signals are compared to the reference signal patterns stored in the training/description process and the most likely gesture is returned. If the gesture signals deviate too far from all reference signals, a "not recognized" is returned. Here, depending on the deviation, a threshold value may be defined by means of which the probability of detection error (the recognized gesture is incorrectly assigned) and erroneous rejection ("miss") (a gesture is not recognized and rejected) may be adapted dependent upon the application.

In an HMM recognizer, the search for the best gesture is preferably conducted using a Viterbi algorithm.

The concept according to the invention allows gesture signals to be supplied to a speech-recognition system and evaluated in a surprisingly effective fashion by the recognition methods already developed for speech recognition. The sensors using low-frequency electric fields (e-field sensors) in a range up to approximately 100 kHz allow for the positive recognition of movements at a distance typically up to 50 cm from the detection electrodes.

Three electrodes are preferably used for a spatial mapping of the gesture, the electrodes providing three tone contributions, each correlating with the dynamic of change in distance. So as to be able to also recognize the shape of the hand in particular, and so as to increase the resolution overall and, optionally, create a certain level of redundancy, it is advantageous to use more than three electrodes, thus creating an optionally overbuilt system with regard to the coordinates.

BRIEF DESCRIPTION OF THE DRAWING

Additional details and features of the invention may be found in the description below with reference to the drawings, in which.

SPECIFIC DESCRIPTION

Figure 1:
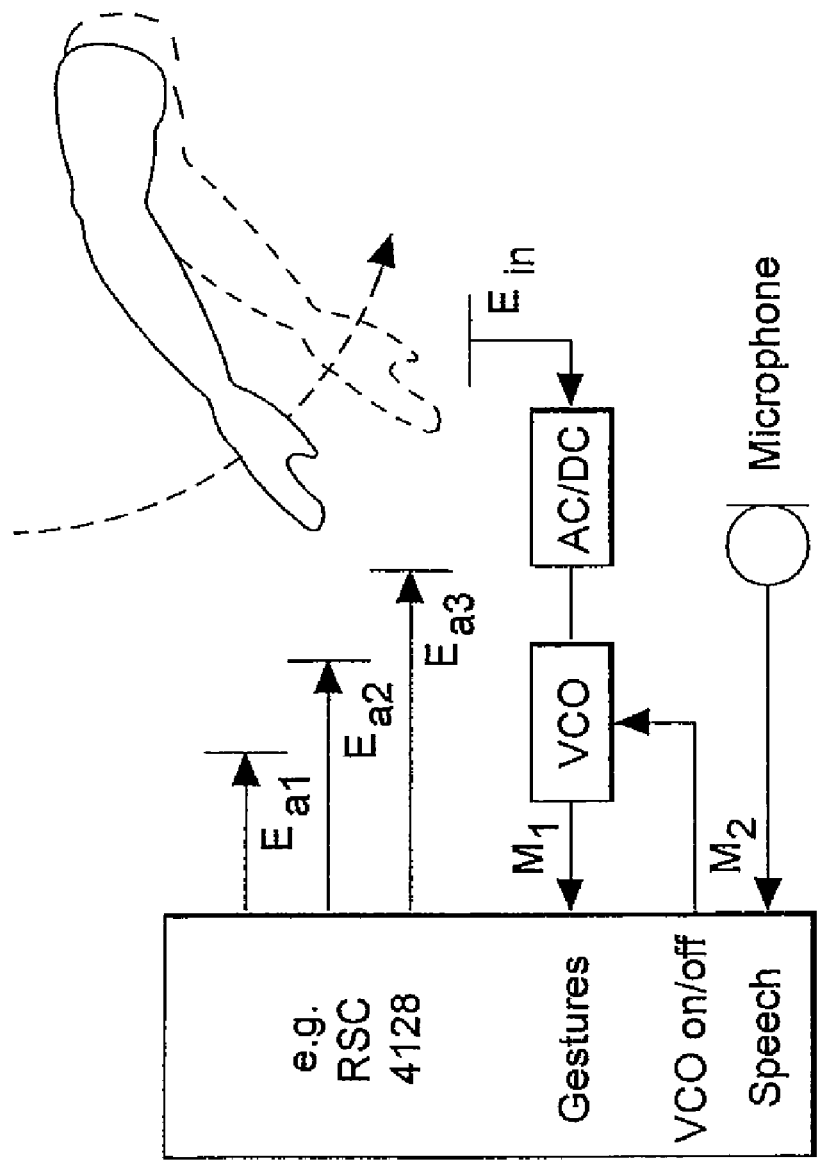
FIG. 1 schematically shows the gesture recognition concept according to the invention in which the spatial movement of a hand is acquired by three transmitting electrodes and a receiving electrode and the signal acquired via the receiving electrode is generated or modified in such a way that the signal may be recognized by a speech-recognition system with sufficient clarity.

FIG. 1 shows a first variant of a circuit according to the invention. An electronic component that is fundamentally suitable and equipped for speech processing (e.g. the component RSC 4128) contains a programmable controller. This controller is directed by firmware to produce an alternating signal at least one I/O port (1-0 sequence). This signal may be emitted either optically, for example, by light-emitting diodes, or in a capacitive fashion, for example, on a coupling surface. In the later case, it produces an alternating electric field. A detector, preferably equipped with a transimpedance amplifier, may receive this field or light originating from the light-emitting diode. This field is converted into direct current that operated a voltage-controlled oscillator VCO. A change in the light intensity of the electric field, for example, by entry of a human limb into the detection area, changes the pitch of the tone, which may decrease or increase. If the corresponding controller pin is activated only briefly (e.g. 40 milliseconds), the change of tone will occur only during this period. Finally, the VCO in question may be switched on or off via another I/O pin, such that no tone is audible during idle periods. The tone sequence produced by proximity is sent to the analysis circuit originally provided for speech processing, the analysis circuit typically comprising a combination of hardware and software, preferably in the same chip that also generates the field or light signal. If the capture of multiple dimensions is desired, several field-generating electrodes or light-emitting diodes are provided as necessary. This may be accomplished with the aid of other I/O pins of the same controller that may be activated one after the other (=sequence).

According to the invention, signal processing and analysis occurs according to the invention by means of analysis techniques for speech processing that are known per se. These speech-recognition techniques are used according to the invention for gesture recognition in that sound-like signal sequences similar to speech are first generated in correlation with the gestures. The analysis of these sound-like signal sequences is comparably reliable because the tones may be generated such that they sound more like a sequence of vowels, and consonants and sibilants may be omitted (though they are not required to be). Thus, it is also possible for verbal and gesture commands to be mixed with one another and performed simultaneously or one after the other. With the aid of neural networks or other learning algorithms, it is possible to train such a system and adjust tolerance thresholds.

In the electronic component shown in FIG. 1, for example, three field-generating electrodes are coupled to its I/O ports (e.g. copper surfaces). A field-receiving electrode $E_{in}$, is located in the vicinity of the field-generating electrodes. This field-receiving electrode is shown on a buffer (e.g. a transimpedance amplifier), a subsequent rectifier circuit comprising diodes and condensers and a voltage-controlled oscillator (VCO, here a spike pulse generator). With the aid of this circuit, it is possible for sequences of tones to be generated whose pitch is changed by proximity, preferably proximity of human limbs. With the aid of a sequencer circuit (software or hardware), the individual electrode surfaces E1 to E3 are then activated one after the other, specifically with an alternating field comprised of 1-0 series with a temporal length, for example, 100 kHz for 20 milliseconds at a time. Alternating electrical fields are generated. The insertion of limbs may weaken the field to the input electrode Ke or act as a bypass. Both effects change the pitch of the connected VCO, whose output is returned to the chip, where the speech processing is integrated. In this manner, a sequence of movements may be trained and evaluated in a simple manner. At the same input (or a different one), a microphone may also be connected that processes spoken commands in the same manner.

Figure 2:
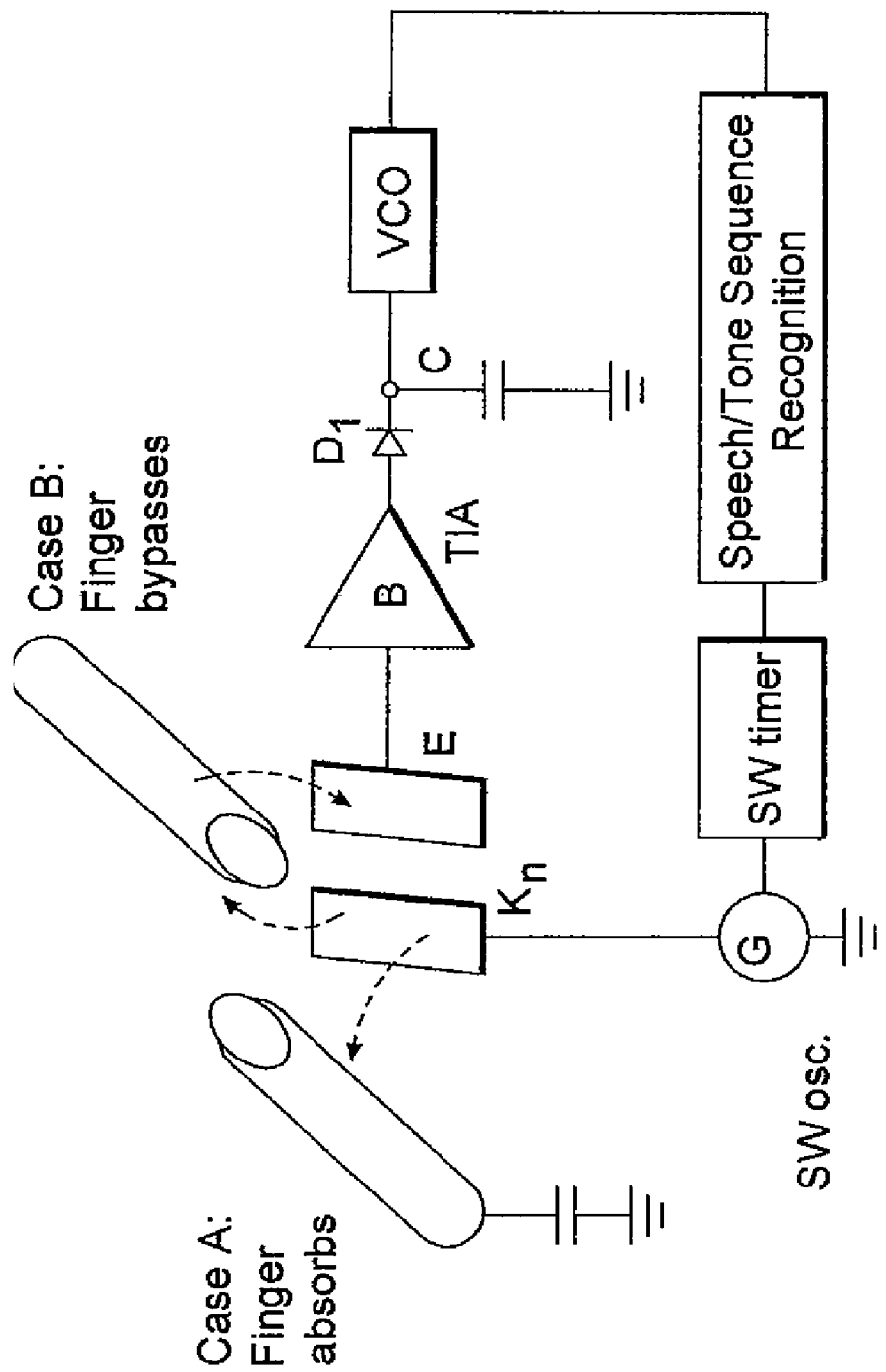
FIG. 2 schematically shows another gesture recognition concept according to the invention.
Figure 3:
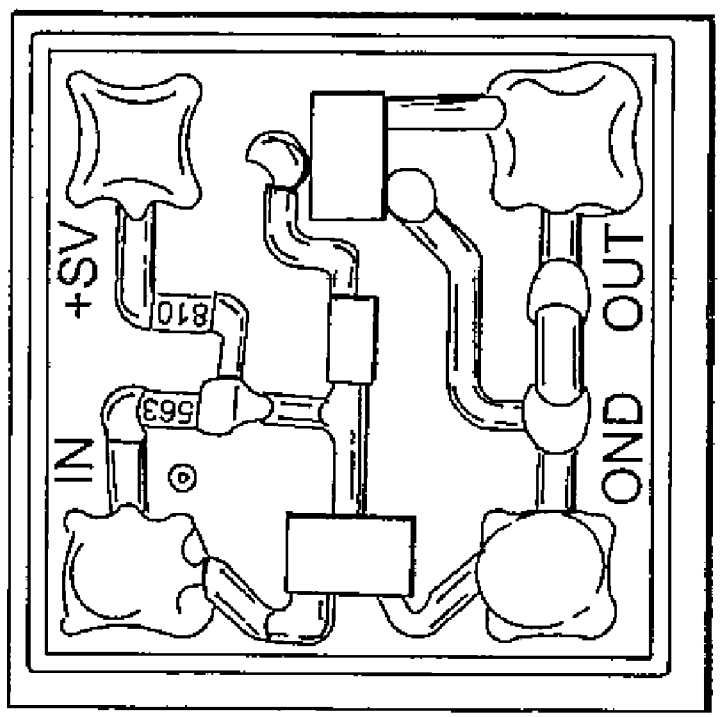
FIG. 3 is a photograph of an acquisition circuit according to the invention by means of which sound-like signals may be generated in correlation with a gesture made relative to an electrode arrangement.
Figure 4:
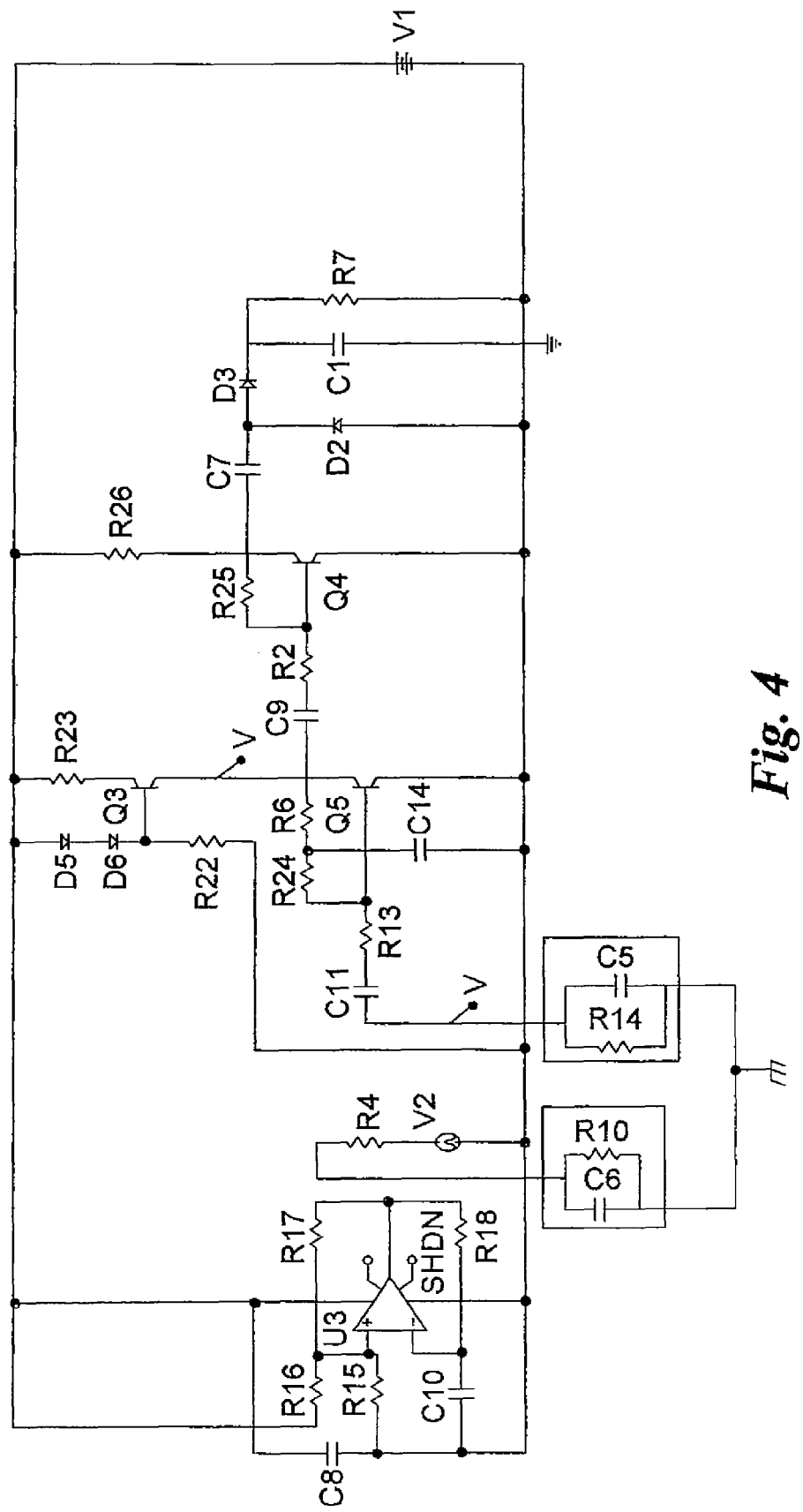
FIG. 4 is a circuit diagram showing the structure of the acquisition circuit according to FIG. 3.

FIG. 2 shows the simple embodiment of the detector with transistors. It is also possible for this circuit to be integrated into the chip and for only the charging condenser, for example, to be attached externally, if necessary. A VCO may also be realized in the chip as a software function.

The present invention may be realized in an extremely cost-effective fashion and is particularly suitable for integration into toys so that they may be controlled by speech and gestures and to enhance the fun of the toy in a lasting fashion. The user is always able to train new speech commands and/or gestures.

However, the invention is also suitable for technical applications and for the field of text and data processing as well as for communication devices. For example, an arrangement of this sort may be installed in a household appliance, for example, inside the drum of a dryer. Different series of signals are produced when laundry is inserted than when, for example, a child (or an animal) climbs into the drum and moves around inside. In addition, the invention also is sensitive to sound. Thus, it is possible to recognize living beings inside household appliances before they are injured by the operation of the appliances. With the aid of this circuit, it is also possible (in the case of intermittent operation) to wake it out of a sleep mode and/or to activate it only with a certain verbal command or a definable gesture (wake-up circuit).

The electrode arrangement described here may also be integrated into furniture in order, for example, to analyze sitting positions or gestures in conjunction with the furniture or to react to verbal commands, for example, adjustable massage tables and the like.

Navigation devices may be made easier to operate with the aid of the invention. Positioning and controlling by gestures allows even zoom functions, which were difficult to realize by touchscreen while driving. If multiple persons want to operate such a system, it is possible to provide user-dependent commands or to analyze the direction from which inserted gestures originated.

The invention may be used advantageously everywhere more expensive individual circuits cannot be used because of their high cost.

Figure 5:
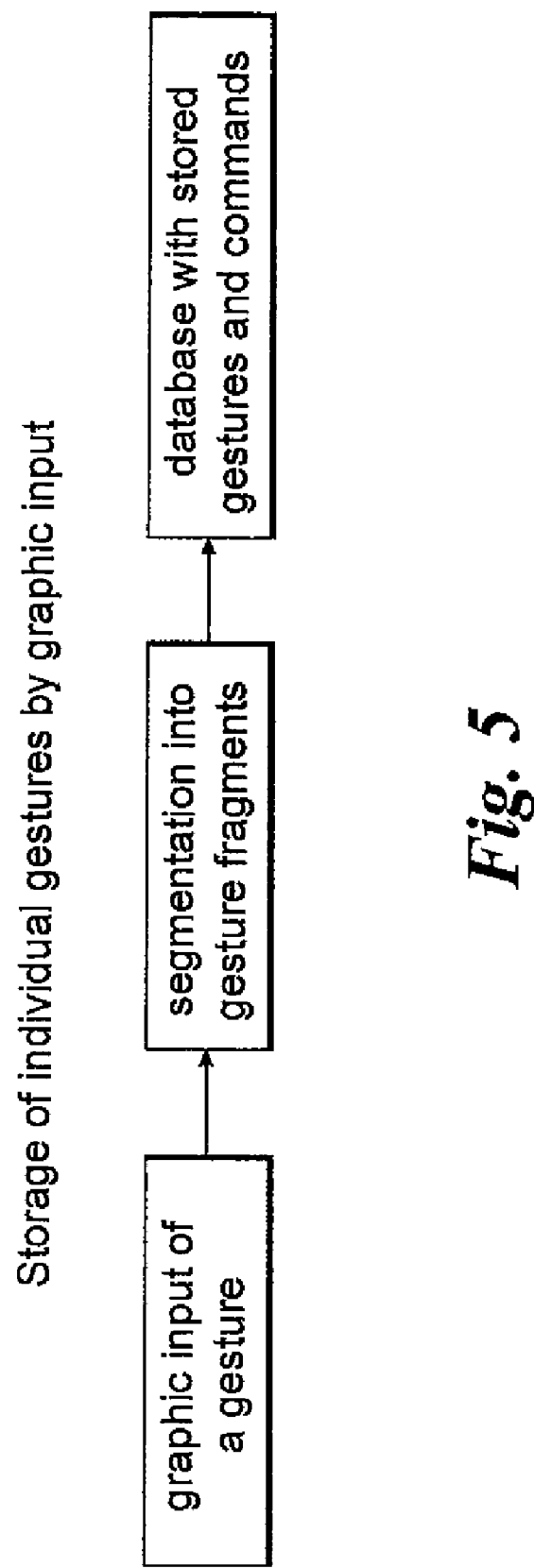
FIG. 5 is a block diagram showing the storage of gestures to be recognized by means of graphic inputs.
Figure 6:
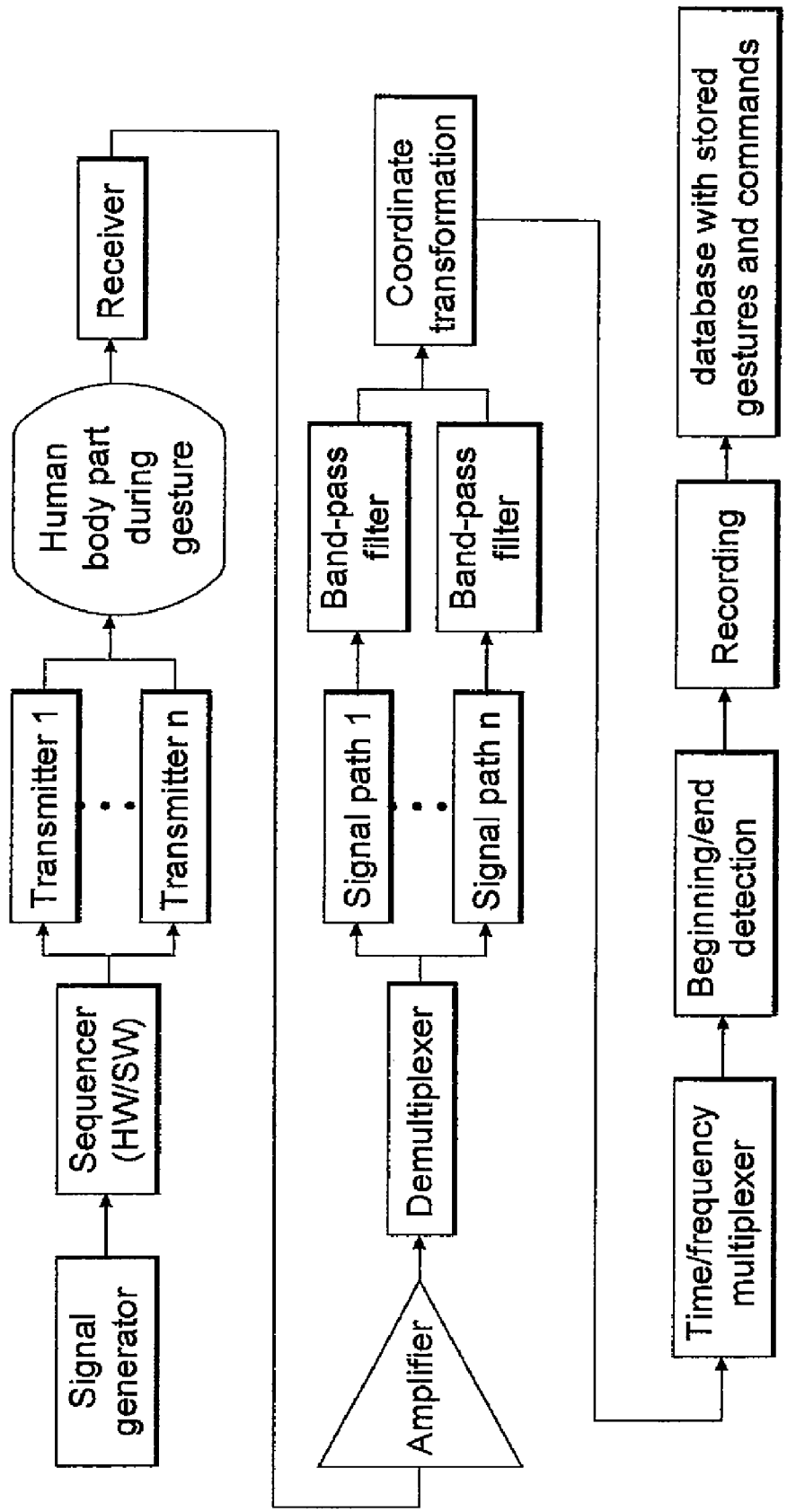
FIG. 6 is a block diagram showing an exemplary system having multiple transmitters and one receiver in the learning mode.
Figure 7:
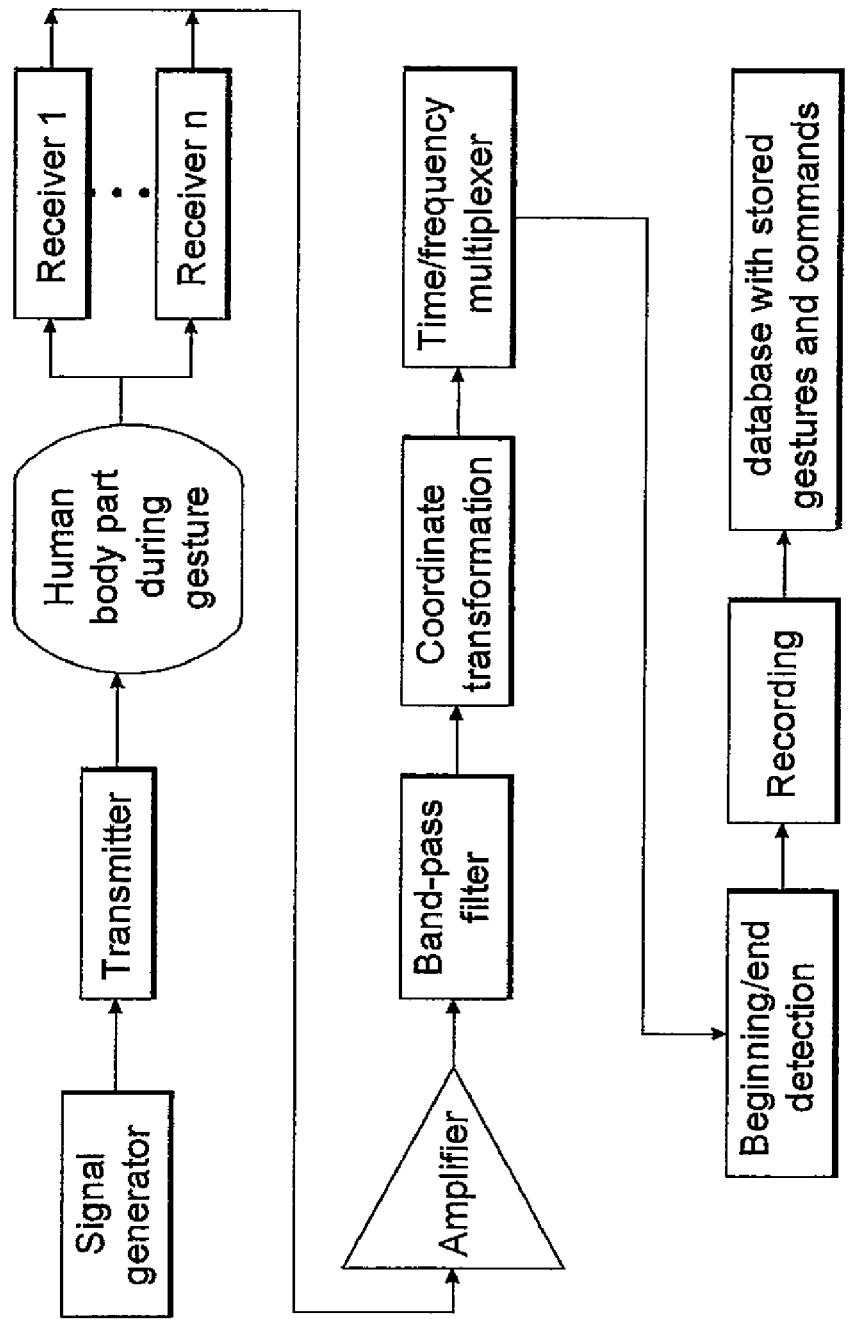
FIG. 7 is a block diagram showing an exemplary system having multiple receivers and one transmitter in the learning mode.
Figure 8:
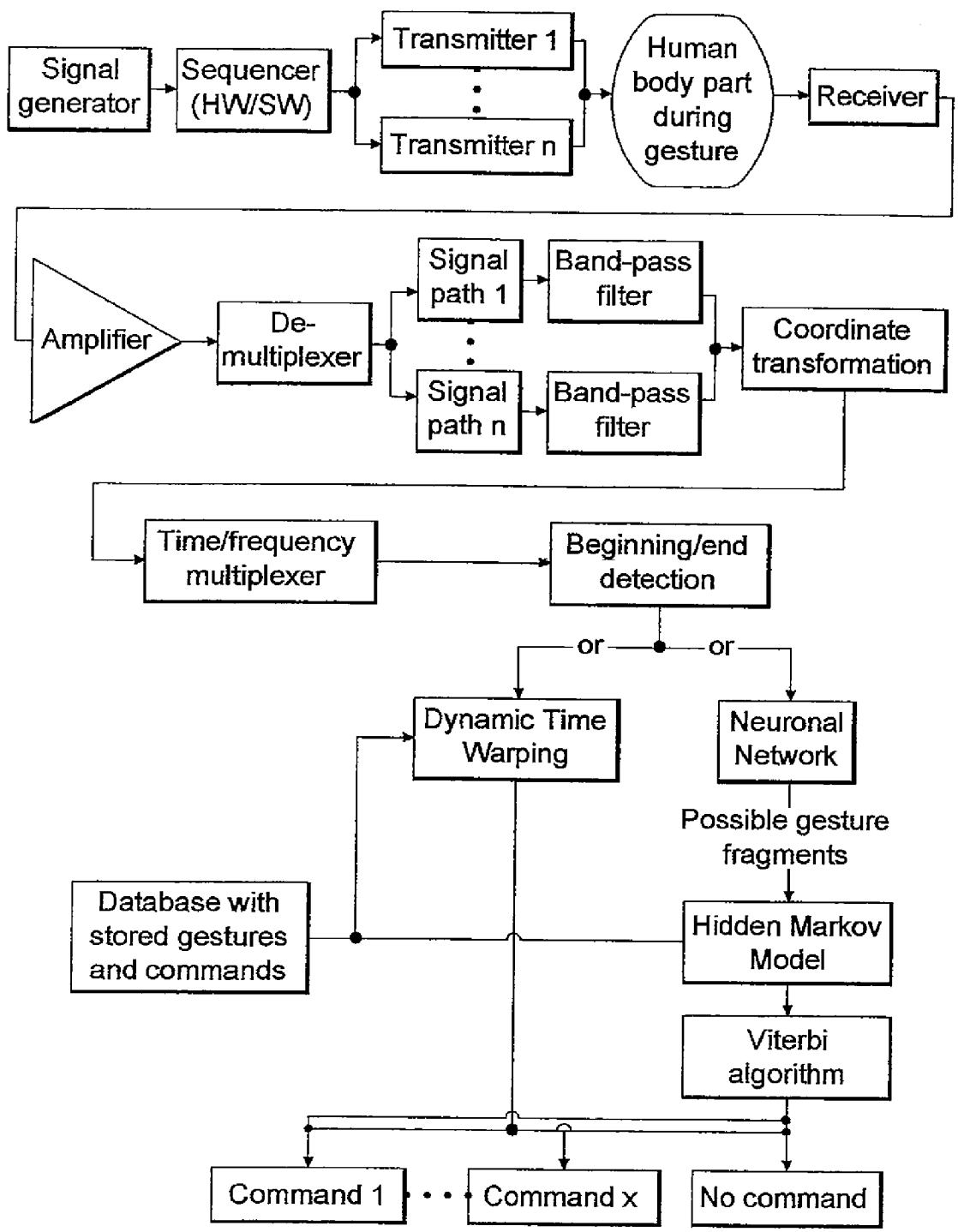
FIG. 8 is a block diagram showing an additional exemplary system with multiple transmitters and one receiver in the recognition mode.
Figure 9:
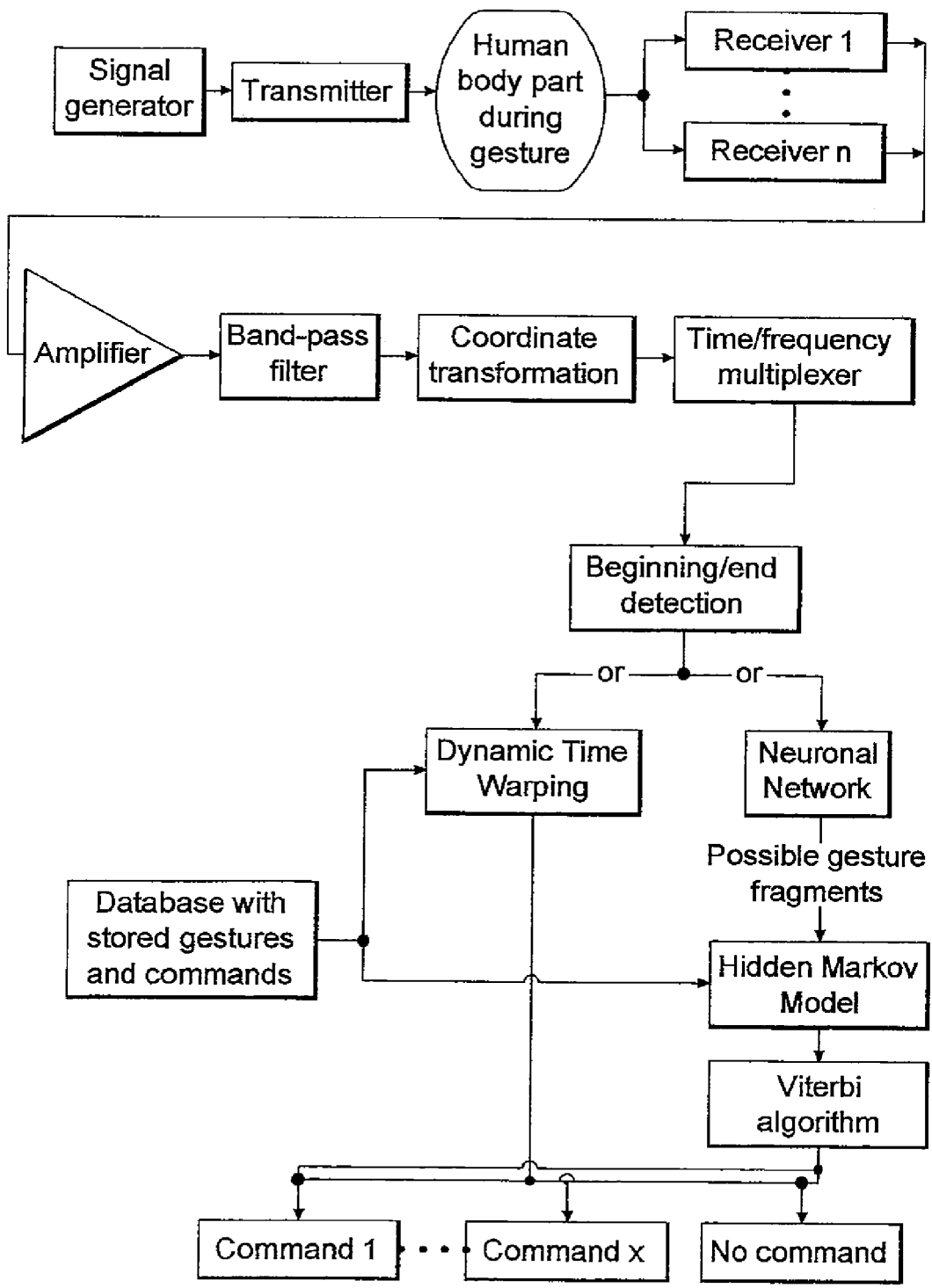
FIG. 9 is a block diagram showing an additional exemplary system having one transmitter and multiple receivers in the recognition mode.

The block diagrams of FIGS. 5 to 9 are self explanatory. FIG. 5 shows a block diagram for the visualization of the storage of gestures to be recognized by means of graphic inputs. FIG. 6 shows a block diagram for the visualization of an exemplary system having multiple transmitters and one receiver in learning mode. FIG. 7 shows a block diagram for the visualization of an exemplary system with multiple receivers and one transmitter in learning mode. FIG. 8 shows a block diagram for the visualization of an additional exemplary system having multiple transmitters and one receiver in recognition mode. FIG. 9 shows a block diagram for the visualization of an additional exemplary system having one transmitter and multiple receivers in recognition mode.

As an alternative to the detection technology described above with multiple transmitters and one receiver or multiple receivers and one transmitter, it is also possible for the individual electrodes to be operated in an alternating fashion as transmitters and receivers and to output the degree of bypass between the respective electrodes functioning as transmitters and receivers and/or the change in the degree of bypass in the form of a correspondingly modulated sound-like signal.

Figure 10:
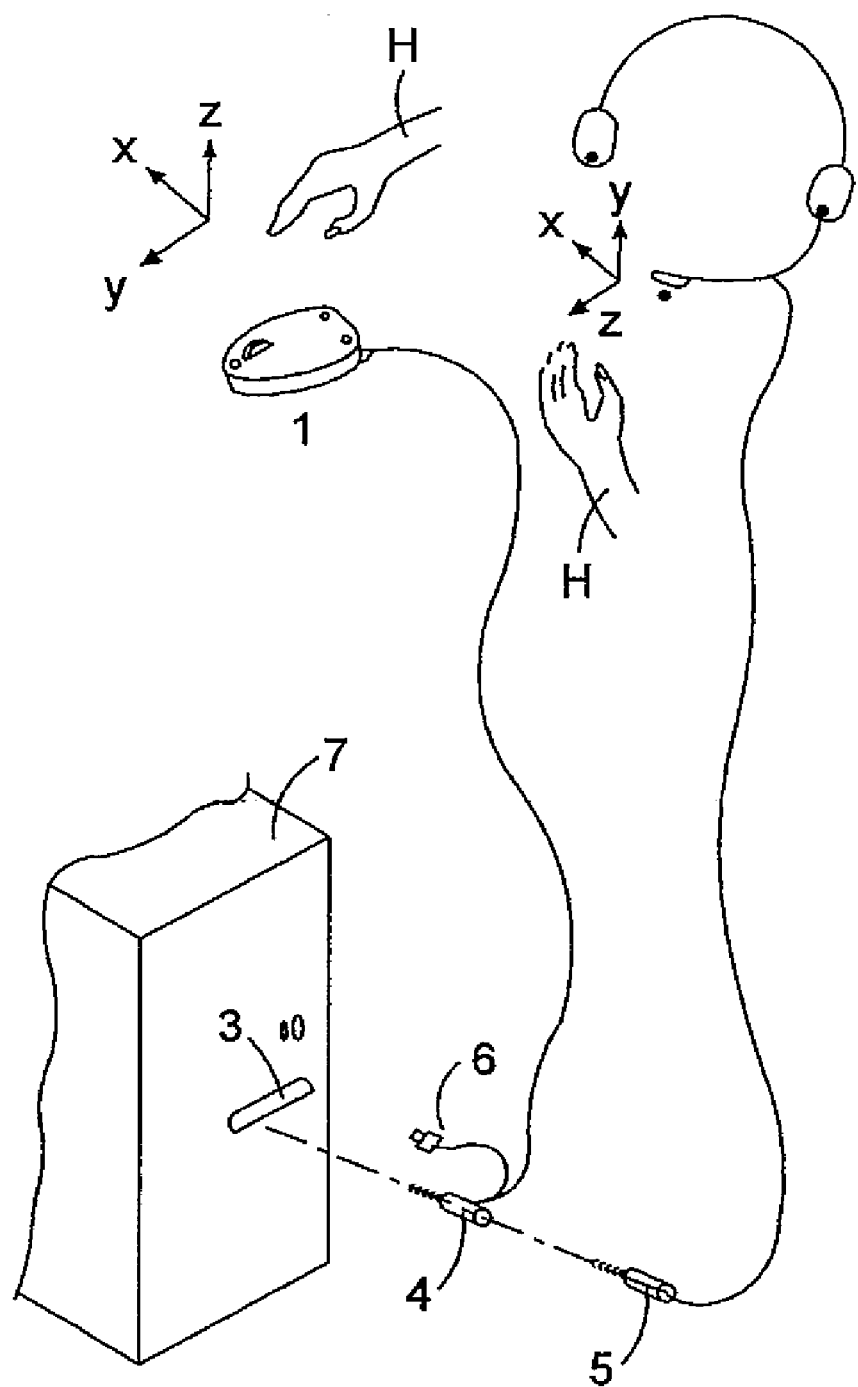
FIG. 10 shows a computer system having a gesture recognition device in which the gesture signals are coupled into a microphone input and the gesture recognition is managed via a speech-recognition program with an extended vocabulary.
Figure 11:
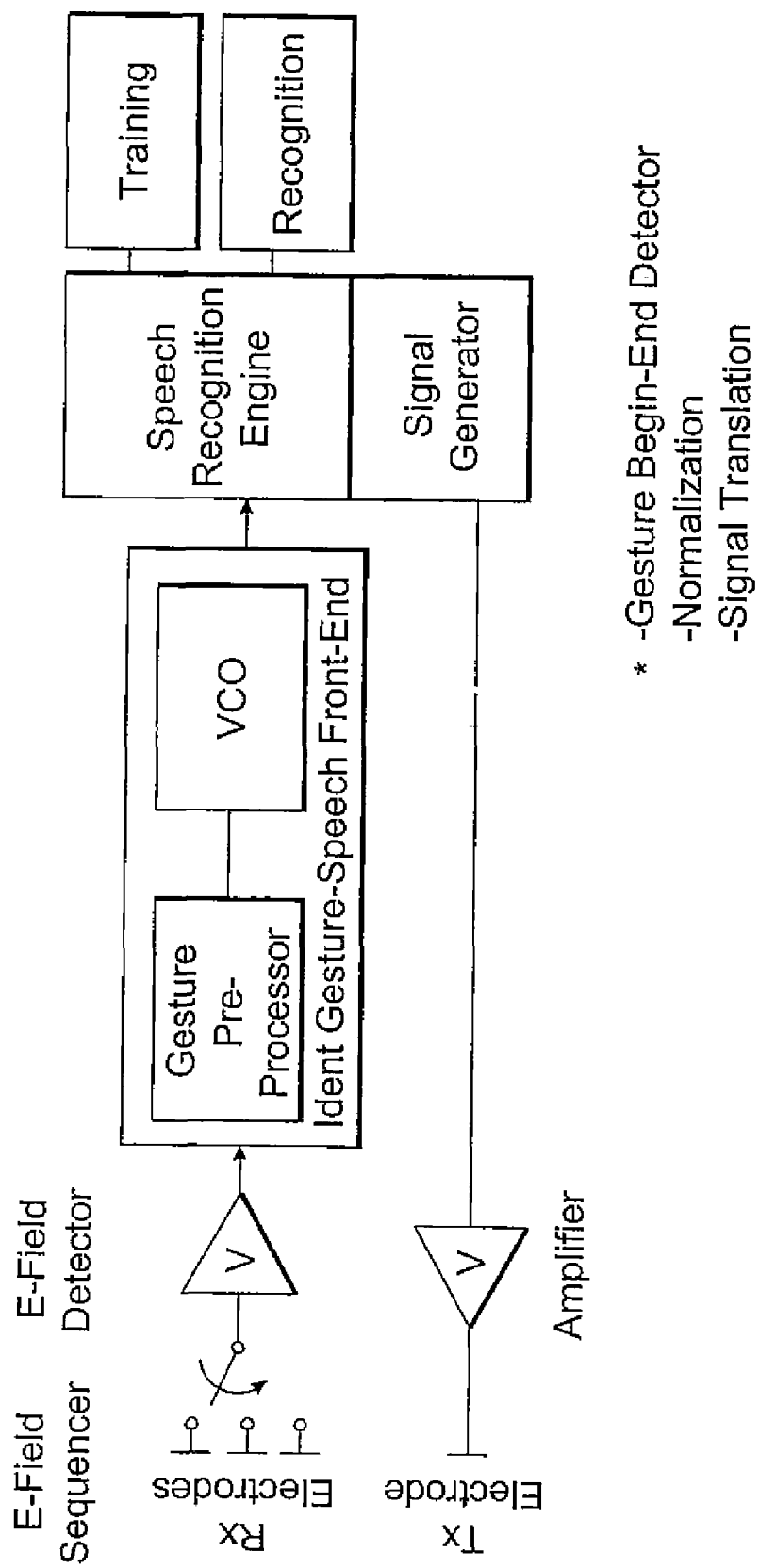
FIG. 11 schematically shows additional details of the concept according to the invention for generating sound-like signals correlating with the contour and dynamics of the gestures, the signals being identified by a speech-recognition system with an easily expandable vocabulary.

FIG. 10 shows an electronic data-processing system comprising a computer mouse 1 equipped with a gesture sensor and a headset 2 also equipped with a gesture sensor. The signals generated by the computer mouse 1 and those generated by the headset 2, which signals are indicative of the motion of the hand H in the three spatial directions x, y, z, are converted into sound-like signals and sent directly to the input of a sound card 3 of a PC. The mouse plug 4 is embodied here as an intermediate plug so that the headset plug may be attached to it as well. A USB plug 6 is also connected to the mouse plug 4 so that the mouse movements may be sent to the PC system 7 in a manner that is known per se.

As an alternative to the cables shown here for the purpose of better understanding, communication with the PC system may also occur wirelessly. The gesture-capture devices according to the invention may also be integrated into other peripherals of the PC, for example, such as the monitor or touchpad, or in the case of a notebook, for example, may be directly integrated into the PC.

The system may be coordinated in such a way that it determines which gesture input device was used to input the gestures. Certain functions may be assigned to each gesture input device. For example, the mouse gesture sensor device may be primarily used for navigation within a document or data. The headset gesture sensor device may particularly be used to coordinate text formatting as well as punctuation marks and corrections. Both gesture sensor devices may optionally be operated at the same time. The mouse gesture sensor device may, for example, be controlled via the hand that is more adept at fine motor skills (predominately the right hand). The remaining free hand may be used to control the second gesture sensor device, for example, the headset gesture sensor device. Certain gestures, for example, simple gestures in the form of a straight-line change in distance relative to the mouse gesture sensor device may be transmitted as continuous tone signals, while more complex gestures with pronounced path and dynamics features may be transmitted with a certain delay as an "individual word" when a gesture-finish characteristic is recognized. The recognition of the gesture-finish characteristic may optionally be managed by additional functions of the converting device connected upstream of the speech-recognition system according to the invention. The gesture-finish characteristic may, for example, be that, within a time frame of 10% of a prior phase caused by the input gesture, no special signal dynamics occur.

The concept according to the invention allows gesture signals to be processed with speech signals in a synergistic fashion.

In applications in which no speech input is necessary, the speech-recognition tool may be used exclusively for gesture interpretation.

On the basis of the concept according to the invention, it is possible to realize a gesture recognition system in a particularly efficient fashion using chip sets or ASICS that were developed for speech-recognition applications.

The present invention may be used in particular in combinations with the techniques described in the abovementioned prior applications filed by the applicant. The scope of disclosure of these older patent applications filed by the applicant and mentioned at the outset is hereby incorporated by reference into the present application.

We claim:

1. A method of translating hand gestures, the method comprising the steps of:
   detecting the hand gestures with an electronic sensor and converting the detected gestures into respective electrical transfer signals in a frequency band corresponding to that of speech;
   inputting the transfer signals in the audible-sound frequency band to a speech-recognition system; and
   analyzing the inputted transfer signals with the speech-recognition system.

2. The method according to claim 1 wherein the input signals are generated by a tone-generator system.

3. The method according to claim 1 wherein the input signals are generated by a terminal circuit.

4. The method according to claim 1 wherein the transfer signals are generated in such a way that they map the spatial movement of the gesture.

5. The method according to claim 1 wherein the transfer signals are composed of three tones, with the composition of the individual tones changing due to the movement of a gesturing hand or a finger according to a movement-mapping rule.

6. The method according to claim 1 wherein, on movement away from a detection point, the pitch of the transfer signal for this reference point increases.

7. The method according to claim 1 wherein, on movement toward a detection point, the pitch of the transfer signal for this reference point decreases.

8. The method according to claim 1 wherein the transfer signals are structured such that they describe the change in distance from the gesturing hand relative to a reference system by means of at least three reference points.

9. The method according to claim 1 wherein the gestures are sensed by at least three e-field sensors producing respective sensor output signals and only those sensor output signals are recognized as gestures in which at least one sensor signal exceeds a predetermined level.

10. The method according to claim 9 wherein only those sensor signals that have a minimum alteration dynamic are recognized as gestures.

11. The method according to claim 10, further comprising the step of determining mathematical derivatives of the sensor signals.

12. The method according to claim 11, further comprising the steps of
   standardizing sensor signals by subtraction of an average time value or direct signal portion of all sensor signals from the respective individual sensor signals.

13. The method according to claim 9, further comprising the step of
   conducting a coordinate transformation of the sensor signals such that the corresponding gestures are mapped in a spatial gesture reference plane.

14. The method according to claim 13 wherein the gesture reference plane is established such that it runs essentially parallel to a sensor-electrode surfaces and transverse to a sensor axis such that the corresponding gestures are always mapped at a certain distance from the sensors.

15. The method according to claim 14 wherein a center of a surface spanned by the gesture lies essentially on the axis of the sensor.

16. The method according to claim 9 wherein the sensor signals are converted to tone sequences that lie in a speech range of 50 Hz-3400 Hz and the various sensor signals are combined into one single gesture signal to be analyzed by the speech-recognition system.

17. The method according to claim 1 wherein the sensor signals are captured via a time multiplexer.

18. The method according to claim 1 wherein the sensor signals are transformed by means of VCO conversion into different frequency bands in the speech frequency range.

19. The method according to claim 1 wherein the gesture recognition is managed using a dynamic time warping pattern recognizer for recognizing total gestures, analogously to word recognition in speech recognition.

20. The method according to claim 1 wherein the gesture recognition is managed using a Hidden Markov Model recognizer known from speech recognition.

21. The method according to claim 1 wherein the gestures to be recognized are trained and stored as reference patterns.

22. The method according to claim 1 wherein gestures that are recognized during a training as being too different are rejected as unreliable.

23. The method according to claim 1 wherein similar gestures that are not rejected are combined by averaging the corresponding reference signals.

24. The method according to claim 1 wherein a gesture training process is supported by visual parameters or visual feedback.

25. A system for translating hand gestures, the system comprising:
   for a gesture detection unit operable to detect the hand gestures and to convert the detected hand gestures into respective electrical transfer signals in a frequency band corresponding to that of speech;
   a speech-recognition system
   wherein the electrical transfer signals are fed to the speech-recognition system for analysis of the inputted transfer signals by the speech-recognition system.

26. The system according to claim 25 wherein the sensor array is integrated into a mouse, mouse pad, headset, keyboard, or monitor.

27. The system according to claim 25 wherein the sensor array is integrated into a household appliance or a machine for performing input operations.

28. The system according to claim 25 wherein the sensor array is integrated into a mobile communications device.

29. The system according to claim 25 wherein the sensor array is integrated into a motor-vehicle navigation system.

30. The system according to claim 25 wherein the sensor array is integrated into an electronic toy.

31. A system for translating hand gestures, the system comprising:

means including a sensor array for detecting the hand gestures and converting the detected gestures into respective electrical transfer signals in a frequency band corresponding to that of speech;

a speech-recognition system; and means for inputting the transfer signals in the audible-sound frequency band to the speech-recognition system for analysis of the inputted transfer signals by the speech-recognition system.

* * * * *